US011366796B2

(12) United States Patent
Valaguru

(10) Patent No.: US 11,366,796 B2
(45) Date of Patent: Jun. 21, 2022

(54) SYSTEMS AND METHODS FOR COMPRESSING KEYS IN HIERARCHICAL DATA STRUCTURES

(71) Applicant: Oracle International Corporation, Redwood Shores, CA (US)

(72) Inventor: Sridhar Valaguru, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 53 days.

(21) Appl. No.: 16/863,025

(22) Filed: Apr. 30, 2020

(65) Prior Publication Data

US 2021/0342323 A1    Nov. 4, 2021

(51) Int. Cl.
*G06F 16/22* (2019.01)
*G06F 16/28* (2019.01)
*G06F 16/182* (2019.01)
*H04L 9/08* (2006.01)

(52) U.S. Cl.
CPC ........ *G06F 16/2246* (2019.01); *G06F 16/182* (2019.01); *G06F 16/282* (2019.01); *H04L 9/0894* (2013.01)

(58) Field of Classification Search
CPC .. G06F 16/2246; G06F 16/182; G06F 16/282; H04L 9/089
USPC ........................................................ 707/797
See application file for complete search history.

(56) References Cited

U.S. PATENT DOCUMENTS

| 2005/0165850 | A1* | 7/2005 | Mosescu | G06F 16/2246 |
| 2013/0034309 | A1* | 2/2013 | Nystad | H04N 19/96 |
| | | | | 382/240 |
| 2015/0331619 | A1* | 11/2015 | Zheng | G06F 16/2255 |
| | | | | 711/154 |
| 2015/0363167 | A1* | 12/2015 | Kaushik | G06F 16/221 |
| | | | | 707/753 |
| 2017/0177447 | A1* | 6/2017 | Golander | G06F 16/1815 |
| 2017/0212680 | A1* | 7/2017 | Waghulde | G06F 3/0644 |
| 2018/0253255 | A1* | 9/2018 | Jain | G06F 3/0673 |
| 2020/0409915 | A1* | 12/2020 | Agrawal | G06F 16/2246 |
| 2021/0224240 | A1* | 7/2021 | Fu | G06F 16/24554 |

* cited by examiner

*Primary Examiner* — Kuen S Lu

(74) *Attorney, Agent, or Firm* — Kilpatrick Townsend Stockton

(57) ABSTRACT

The present disclosure describes systems and methods for enhancing the space utilization of storing keys in hierarchical data structures, such as B+Tree leaf blocks, by partially or fully compressing the keys. Partially compressing the keys may include storing certain keys as offsets from a start key. Fully compressing the keys may include setting a "type" value included in the header of the leaf block to a value indicating that the keys are implicitly represented by an ordinal key index, which defines the ordinal arrangement of keys in the leaf block. Partially or fully compressing keys, according to the implementations described herein, reduces the amount of space needed to store keys in a leaf block of a B+Tree.

17 Claims, 11 Drawing Sheets

SYSTEMS AND METHODS FOR COMPRESSING KEYS IN HIERARCHICAL DATA STRUCTURES

TECHNICAL FIELD

The present disclosure generally relates to systems and methods for enhancing the space utilization of keys stored in leaf blocks of a hierarchical data structure. More particularly, the present disclosure relates to systems and methods for improving the space utilization of storing keys in a leaf block by partially or fully compressing the keys.

BACKGROUND

Computer files are generally stored in block-oriented storage devices. The block-oriented storage devices may segment space (e.g., disk space) into fixed blocks. Data from files may be allocated to certain fixed blocks. When an end user requests access to a file, for example, a file system determines which blocks contain the data representing the file and retrieves the data from those blocks to reconstruct the file. The file system often creates a content range map that maps keys representing offsets in a file or files in a directory to certain blocks using pointers. The content range map stores the key-pointer pairs representing a file, for example. However, storage of key-pointer pairs in content range maps can be inefficient.

SUMMARY

Certain aspects and features of the present disclosure relate to compressing keys stored in a leaf block of a hierarchical data structure, such as a B+Tree. A leaf block of a B+Tree may be configured to store a set of keys according to an ordinal key index. Each key may represent metadata of a file or directory (e.g., a file identifier, an object identifier, and a file offset). The ordinal key index may represent the ordinal numbering of the set of keys in the leaf block (e.g., the ordinal numbering of 0 to 99 for 100 keys). The set of keys can be compared against each other to detect similar properties across the set of keys. For example, detecting similar properties may include detecting that the set of keys are contiguous (e.g., adjacent) or that the keys are the same size. The set of keys may be compressed or implicitly stored in the leaf block according to the detected similar properties, which improves the space utilization of the B+Tree.

In some implementations, when the keys are contiguous, a start key may be identified from the set of keys. The start key may represent the first one or more bytes of a file and the remaining keys in the set of keys may be referred to as subsequent keys. The start key may be stored in full in the leaf block, whereas, the subsequent keys may be stored in the leaf block in a compressed manner. For a given subsequent key, compressing the subsequent key may include performing a key difference function to determine an offset between the start key and the subsequent key. The offset may represent the difference between the start key and the subsequent key. The subsequent key can be compressed by storing the offset associated with the subsequent key in the leaf block, instead of storing the subsequent key in full, thereby improving the space utilization of storing keys in the leaf block. Each subsequent key may be stored in the leaf block as an offset from the start key, rather than storing the subsequent key in full.

Additionally, when the keys are contiguous and when the offsets associated with the set of keys are of the same size, the offsets may be further compressed in the leaf block. Instead of storing the offset of a given subsequent key in the leaf block, a block type value in the header of the leaf block may be set to a predetermined value (e.g., "1"), indicating that each offset is represented by the ordinal key index corresponding to that offset. As an illustrative example, the set of keys may be a group of 100 keys arranged or ordered from the first key to the $100^{th}$ key. The key difference function may be performed on the start key and the third key in the set of keys (e.g., ordinal number 3). An offset representing the difference between the start key and the third key may be determined. When the offsets between the start key and each key in the set of keys are the same size, such as a fixed range of 4 KB in a block-oriented storage device, the offsets may be implicitly represented by the ordinal key index. In this example, instead of storing in the leaf block the offset between the start key and the third key in the set of keys, the ordinal number 3, which corresponds to the third key, may implicitly represent the offset for the third key. Thus, neither the full third key nor the offset between the start key and the third key are stored in the leaf block. Instead, the block type value being set to the predetermined value (e.g., "1") may indicate that the offsets are implicit and match the ordinal key index.

In some implementations, when the keys are not contiguous, certain aspects and features of the present disclosure relate to creating a new data structure, such as a table, that stores the offset for each key in a contiguous space. The new data structure may be stored in an address space of memory, but the present disclosure is not limited thereto. The new data structure may sequentially order the keys in a manner that matches the ordinal key index of the leaf block. When the sequential order of the keys stored in the new data structure match the ordinal key index of the leaf block, then the offsets can be further compressed, as described above. For example, the offsets may not be stored in the leaf block, but rather the offsets may be implicitly represented by the ordinal key index.

In some implementations, the B+Tree with enhanced space utilization described herein may be used as a file layout tree for a particular file. A key in these implementations may be represented by a file identifier, an object identifier, and a file offset.

In some implementations, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a file system, including: one or more processors; and a non-transitory computer-readable storage medium containing instructions which, when executed on the one or more processors, cause the one or more processors to perform operations including: accessing a set of keys, each key of the set of keys being associated with a pointer to one or more data blocks of a block-oriented storage device, the set of keys being arranged according to an ordinal key index, and the set of keys including a start key being first from amongst the set of keys. The operations also include defining a hierarchical data structure configured to store the set of keys, the hierarchical data structure including a leaf block, the leaf block being configured to store a subset of the set of keys according to the ordinal key index. The operations may also include determining whether the subset of the set of keys is contiguous. The operations may also include, in response to determining that the subset of the set of keys is contiguous, compressing the subset of the set of keys. The operations may also include storing the compressed subset of the set of keys in the leaf block. Other embodiments of this aspect include corresponding computer systems, apparatus, and computer programs recorded on one or more computer storage devices, each configured to perform the actions of the methods.

Implementations may include one or more of the following features. The file system where the operation of compressing the subset of the set of keys further includes: comparing the start key with each subsequent key of the subset of the set of keys. The operations may also include determining, based on the comparison, an offset for each subsequent key of the subset of the set of keys, the offset representing a difference between the start key and the subsequent key. The file system where the operation of compressing the subset of the set of keys further includes: storing the start key in full in the leaf block. The operations may also include storing, in the leaf block, the offset for each subsequent key of the subset of the set of keys, the offset for each subsequent key being stored in the leaf block according to the ordinal key index. The file system where the operation of compressing the subset of the set of keys further includes: determining that the offset for each subsequent key of the subset of the set of keys is a same size. The operations may also include, in response to determining that the offsets for the subset of the set of keys are the same size, performing an additional compression of the subset of the set of keys by setting a value for a block type variable included in a header of the leaf block, the value indicating that the offset for each subsequent key of the subset of the set of keys matches the ordinal key index. The operations may also include storing the start key in full in the leaf block without storing the subsequent keys or the offsets of the subsequent keys. Each subsequent key after the start key in the subset of the set of keys may be implicitly represented by the ordinal key index. The operations may further include: in response to determining that the subset of the set of keys are not contiguous, storing the subset of the set of keys in a new data structure including a set of records, the subset of the set of keys being contiguous in the new data structure, and each record of the set of records of the new data structure including a key after the start key of the subset of the set of keys and the associated offset of the key. The operations may also include compressing the subset of the set of keys using the ordinal key index. The hierarchical data structure may be a B+Tree, where each key of the subset of the set of keys represents a file offset of a file, and where the B+Tree is used to store a file layout tree representing the file. Implementations of the described techniques may include hardware, a method or process, or computer software on a computer-accessible medium.

One general aspect includes a computer-implemented method including: accessing a set of keys, each key of the set of keys being associated with a pointer to one or more data blocks of a block-oriented storage device, the set of keys being arranged according to an ordinal key index, and the set of keys including a start key being first from amongst the set of keys. The computer-implemented method also includes defining a hierarchical data structure configured to store a subset of the set of keys, the hierarchical data structure including a leaf block, the leaf block being configured to store the subset of the set of keys according to the ordinal key index. The computer-implemented method also includes determining whether the subset of the set of keys is contiguous. The computer-implemented method also includes in response to determining that the subset of the set of keys are contiguous, compressing the subset of the set of keys. The computer-implemented method also includes storing the compressed subset of the set of keys in the leaf block. Other embodiments of this aspect include corresponding computer systems, apparatus, and computer programs recorded on one or more computer storage devices, each configured to perform the actions of the methods.

Implementations may include one or more of the following features. The computer-implemented method where compressing the subset of the set of keys further includes: comparing the start key with each subsequent key of the subset of the set of keys. The computer-implemented method may also include determining, based on the comparison, an offset for each subsequent key of the subset of the set of keys, the offset representing a difference between the start key and the subsequent key. The computer-implemented method where the operation of compressing the subset of the set of keys further includes: storing the start key in full in the leaf block. The computer-implemented method may also include storing, in the leaf block, the offset for each subsequent key of the subset of the set of keys, the offset for each subsequent key being stored in the leaf block according to the ordinal key index. The computer-implemented method where compressing the subset of the set of keys further includes: determining that the offset for each subsequent key of the subset of the set of keys is a same size. The computer-implemented method may also include in response to determining that the offsets for the subset of the set of keys are the same size, performing an additional compression of the subset of the set of keys by setting a value for a block type variable included in a header of the leaf block, the value indicating that the offset for each subsequent key of the subset of the set of keys matches the ordinal key index. The computer-implemented method may also include storing the start key in full in the leaf block without storing the subsequent keys or the offsets of the subsequent keys. The computer-implemented method where each subsequent key after the start key in the subset of the set of keys is implicitly represented by the ordinal key index. The computer-implemented method further including: in response to determining that the subset of the set of keys are not contiguous, storing the subset of the set of keys in a new data structure including a set of records, the subset of the set of keys being contiguous in the new data structure, and each record of the set of records of the new data structure including a key after the start key of the subset of the set of keys and the associated offset of the key. The computer-implemented method may also include compressing the subset of the set of keys using the ordinal key index. The computer-implemented method where the hierarchical data structure is a B+Tree, where each key of the subset of the set of keys represents a file offset of a file, and where the B+Tree is used to store a file layout tree representing the file. Implementations of the described techniques may include hardware, a method or process, or computer software on a computer-accessible medium.

One general aspect includes a computer-program product tangibly embodied in a non-transitory machine-readable storage medium, including instructions configured to cause a data processing apparatus to perform operations including: accessing a set of keys, each key of the set of keys being associated with a pointer to one or more data blocks of a block-oriented storage device, the set of keys being arranged according to an ordinal key index, and the set of keys including a start key being first from amongst the set of keys.

The computer-program product also includes defining a hierarchical data structure configured to store the set of keys, the hierarchical data structure including a leaf block, the leaf block being configured to store a subset of the set of keys according to the ordinal key index. The computer-program product also includes determining whether the subset of the set of keys is contiguous. The computer-program product also includes in response to determining that the subset of the set of keys is contiguous, compressing the subset of the set of keys. The computer-program product also includes storing the compressed subset of the set of keys in the leaf block. Other embodiments of this aspect include corresponding computer systems, apparatus, and computer programs recorded on one or more computer storage devices, each configured to perform the actions of the methods.

Implementations may include one or more of the following features. The non-transitory machine-readable storage medium where the operation of compressing the subset of the set of keys further includes: comparing the start key with each subsequent key of the subset of the set of keys. The non-transitory machine-readable storage medium may also include determining, based on the comparison, an offset for each subsequent key of the subset of the set of keys, the offset representing a difference between the start key and the subsequent key. The non-transitory machine-readable storage medium where the operation of compressing the subset of the set of keys further includes: storing the start key in full in the leaf block. The non-transitory machine-readable storage medium may also include storing, in the leaf block, the offset for each subsequent key of the subset of the set of keys, the offset for each subsequent key being stored in the leaf block according to the ordinal key index. The non-transitory machine-readable storage medium where the operation of compressing the subset of the set of keys further includes: determining that the offset for each subsequent key of the subset of the set of keys has a same size. The non-transitory machine-readable storage medium may also include in response to determining that the offsets for the subset of the set of keys are the same size, performing an additional compression of the subset of the set of keys by setting a value for a block type variable included in a header of the leaf block, the value indicating that the offset for each subsequent key of the subset of the set of keys matches the ordinal key index. The non-transitory machine-readable storage medium may also include storing the start key in full in the leaf block without storing the subsequent keys or the offsets of the subsequent keys. The non-transitory machine-readable storage medium where each subsequent key after the start key in the subset of the set of keys is implicitly represented by the ordinal key index. The non-transitory machine-readable storage medium where the operations further include: in response to determining that the subset of the set of keys is not contiguous, storing the subset of the set of keys in a new data structure including a set of records, the subset of the set of keys being contiguous in the new data structure, and each record of the set of records of the new data structure including a key after the start key of the subset of the set of keys and the associated offset of the key. The non-transitory machine-readable storage medium may also include compressing the subset of the set of keys using the ordinal key index. Implementations of the described techniques may include hardware, a method or process, or computer software on a computer-accessible medium.

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
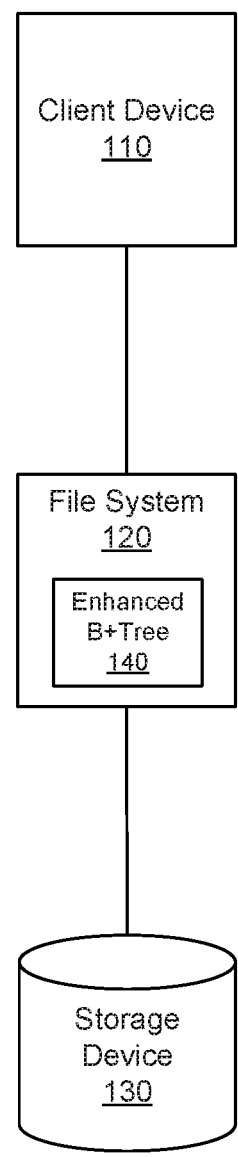
FIG. 1 is a block diagram illustrating an example of a network environment, according to some aspects of the present disclosure.

A hierarchical data structure, such as a B+Tree, is a flexible data structure configured to store a sorted key-value pair in block-oriented storage devices. Given a key, the B+Tree can be used for lookup operations performed by a file system. Further, the B+Tree can store a group of keys and their corresponding values in one or more leaf blocks. Inefficient space utilization in a B+Tree block, however, can cause a technical problem when provisioning solid-state device (SSD) space for deploying cloud applications. Provisioning the size of SSD space for cloud applications is technically challenging and difficult to predict when the SSD space utilization is inefficient. In some cases, poor space utilization may cause the file system to exhaust the SSD space allocated to cloud applications before exhausting other cheaper or slower storage, such as space on a hard disk. Additionally, in some cases, performance sensitive data may be pushed out to slower storage, which has a significant negative impact on the performance of data storage.

Certain implementations of the present disclosure relate to improving space utilization in a B+Tree leaf block by compressing the keys that are stored in the leaf block. A B+Tree leaf block may store in full the first key of a group of keys. The subsequent keys can be stored in the leaf block in a partially or fully compressed manner. In examples where the group of keys is contiguous, the subsequent keys may be stored in the leaf block in a partially compressed manner. For example, each subsequent key may be stored as an offset from the first key of the group of keys. The offset representing the subsequent key may be stored, instead of the full subsequent key. In examples where the group of keys is contiguous and the offsets associated with the subsequent keys are of the same size (e.g., 8 Bytes), the offsets may be further compressed in the leaf block (e.g., fully compressed). Instead of storing the offset of a given subsequent key in the leaf block, a block type value in the header of the leaf block may be set to a predetermined value (e.g., "1"), indicating that each offset is represented by the ordinal key index corresponding to that subsequent key within the group of keys. In examples where the keys are not contiguous, certain aspects and features of the present disclosure relate to creating a new data structure, such as a table, that stores the offset for each key in a contiguous space. The new data structure may sequentially order the keys in a manner that matches the ordinal key index of the leaf block.

To illustrate and only as a non-limiting example, each key of a group of keys may be represented by a file identifier (e.g., a pair of the directory identifier and the object identifier) and a file offset. When partially compressed, only the file offset of a key may be stored. Each subsequent key is an offset from the first key in the group of keys, and thus, the file identifier included in each subsequent key need not be stored in the leaf block. When fully compressed, neither of the file identifier nor the file offset is stored in the leaf block. Instead, the leaf block header may be modified to indicate that the subsequent keys are implicitly represented by the ordinal key index. When querying a key stored in the leaf block, a key can be reconstructed from using a key addition function.

FIG. 1 is a block diagram illustrating an example of a network environment for compressing keys in a B+Tree leaf block. Network environment 100 may include client device 110, file system 120, and storage device 130. Client device 110 may be any portable (e.g., smartphone, laptop, tablet computer, etc.) or non-portable (e.g., desktop computer, electronic kiosk, etc.) end-user device. Client device 110 may execute applications that can create and save files (e.g., a word processing application can create and save a document). File system 120 may control how data is stored on or retrieved from physical storage devices 130. Storage device 130 may include one or more hard disk drives (HDDs), solid-state drives (SSDs), optical drives, floppy disks, magnetic tape storage, Flash memory, cloud or network storage, and/or other types of physical components or devices for recording and retaining digital data. In turn, the data stored on storage device 130 may include audio, video, multimedia, documents, databases, files, directories, file systems, applications, operating systems, virtual machines, and/or other types of digital data used or manipulated by computer systems or electronic devices.

File system 120 may create data blocks from the physical storage, such as hard disk drives, of storage device 130. Each data block may be a fixed size. In some implementations, for each file created by client device 110, file system 120 may generate a corresponding file layout tree that maps the file to certain data blocks of storage device 130. The file layout tree may store pointers to the data blocks that store the various portions of the file. According to certain implementations, file system 120 may generate enhanced B+Tree 140 with enhanced space utilization.

Enhanced B+Tree 140 may compress the amount of space used to store keys, for example, a group of keys associated with a particular file. For example, enhanced B+Tree 140 may be a B+Tree including one or more leaf blocks. The key-value pairs associated with the particular file may be stored in the one or more leaf blocks. A leaf block may store the first key in the group of keys. The first key may be stored in full. Any subsequent key may be stored in either a partially or fully compressed format. For example, in the partially compressed format, the subsequent keys may be stored as an offset from the first key. When the keys are contiguous and when the offsets are of the same size (e.g., 8 bytes), then the keys may be implicitly stored in the leaf block according to the ordinal key index associated with the keys. In this scenario, the leaf block header may be modified to indicate that the keys are implicitly stored (e.g., represented by the ordinal key index).

In some implementations, pointer blocks of the B+Tree may be stored in SSDs, which are costlier than other storage devices, such as hard disk drives. As a technical advantage, improving the space utilization of the pointer blocks stored in the SSDs reduces the amount of space used in the costlier SSD space. Further, in the context of cloud deployment of tiered storage, SSD space can be provisioned for a cloud application. Additionally, when the B+Tree is used to store a file layout tree, enhancing the space utilization of the file layout tree improves the accuracy of sizing the provisioned SSDs for cloud applications. In cases where the space utilization is inefficient, the sizing of provisioned SSDs may be inaccurate, in that the file system may exhaust SSD storage space before exhausting other cheaper physical storage.

Figure 2:
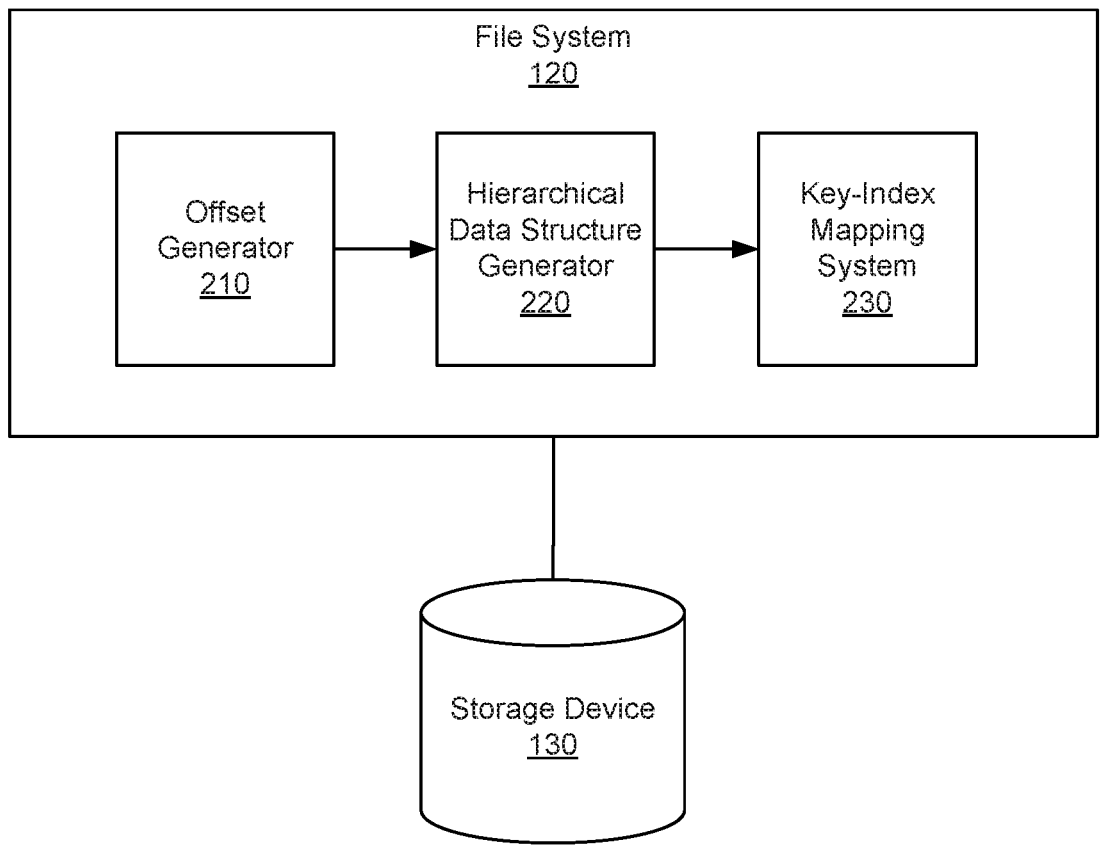
FIG. 2 is a block diagram illustrating another example of a network environment, according to some aspects of the present disclosure.

FIG. 2 is a block diagram illustrating another example of a network environment for storing files. Network environment 200 may be similar to network environment 100, in that file system 120 and storage device 130 are included. In some implementations, file system 120 may include offset generator 210, hierarchical data structure generator 220, and key-index mapping system 230. Offset generator 210, hierarchical data structure generator 220, and key-index mapping system 230 may operate as part of file system 120 to enhance the space utilization of storing keys in a B+Tree leaf block.

Offset generator 210 may include one or more processors that store executable code. The executable code, when executed, may generate an offset between a first key in a group of keys and each subsequent key in that group of keys. Offset generator 210 may perform a key difference function to generate the offset for each subsequent key. For example, if there are five keys to be stored in a B+Tree block, offset generator 210 may perform the key difference function to generate four offsets, such that each offset represents the space between the first key and the subsequent key. An offset may not be calculated for the first key because the first key may be stored in full in the leaf block. The first key may be the initial key in a key space (e.g., the first file location of a data block storing the first portion of the file). Offset generator 210 may perform the key difference function using two keys (e.g., Key 1, such as the first key, and Key 2, the subsequent key) and may output the difference between the two keys (e.g., Key 2 minus Key 1). The output represents an offset of the distance from the first key to the subsequent key. In some implementations, the output includes three items of data: (1) the type of the offset (e.g., identifying how the offset is to be interpreted); (2) the offset blob length (e.g., the length of the buffer that is holding the offset); and (3) the offset block (e.g., a pointer to the block that contains the information about the offset).

In some implementations, if a group of keys corresponds to the same file, then the key difference is determined by computing the difference of offsets divided by the size of a data block. For example, the key difference function may include dividing the offset by the block size to take advantage of an optimization, in which offsets are the same as the ordinal key index of the leaf block. In these implementations, the type of the offset may be set to a value (e.g., a value of "1"), which indicates that each subsequent key in the group of keys is implicitly represented by the ordinal key index. If the group of keys corresponds to two or more files, then when offset generator 210 performs the key difference function, offset generator 210 may return the entire key as the difference. In this example, the type of the offset may be set to a different value (e.g., a value of "2"), which indicates that the full key is returned as is.

In some implementations, offset generator 210 may perform a key addition function. For example, the offset generator 210 may receive a key (e.g., the first key in the group of keys) and an offset associated with a subsequent key (e.g., offset type, offset length, and offset block) and may output the subsequent key, which was used to generate the offset. The key difference function and/or the key addition function may be called by any of the offset generator 210, the hierarchical data structure generator 220, or the key-index mapping system 230 during the generation of the hierarchical data structure, such as a B+Tree. In some examples, the file system 120 may query the B+Tree for a key. Offset generator 210 can generate the queried key by invoking the key addition function. When the keys are fully compressed within the leaf block, for example, the ordinal key index position associated with the queried key can be identified. The ordinal key index position multiplied by the offset size may represent the offset associated with the queried key. The first key and the offset of the queried key can be inputted into the key additional function to generate the queried key in full.

Hierarchical data structure generator 220 may include one or more processors that store executable code and one or more data structures. The executable code, when executed, may generate the hierarchical data structure, such as a B+Tree. In some implementations, hierarchical data structure generator 220 may generate a B+Tree and compress a group of keys for storing in the B+Tree leaf blocks. A B+Tree leaf block may store key-value pairs of the group of keys. The value in a key-value pair may be a pointer to a data block storing the portion of the file represented by or associated with the key.

Depending on the size of the offset associated with a key, the format of the leaf block header may be automatically changed. For instance, when the offset size is less than the size of the key and when the size of the offsets are the same, then the keys can be further compressed by not storing the offsets in the leaf block (e.g., the offset of each key is not stored in the leaf block because the ordinal key index implicitly represents the keys). In this case, instead of storing the offset in the leaf block, a block type value in the leaf block header may be automatically set to a specific value, such as "1," to indicate that the keys are fully compressed in the leaf block, and thus, the offsets are implicitly represented by the ordinal key index. To illustrate, when file system 120 queries the B+Tree for the Nth key in the leaf block, file system 120 may invoke the key addition function. File system 120 may execute the key additional function using as input the first key and N multiplied by the offset size, which represents the Nth key. The offset type and the offset size may already be stored in the header of the leaf block. If, however, the offset size is less than the key size, but the offset does not match the ordinal key index (e.g., the keys are not contiguous in a key space), then a table of offsets is generated and used to store the offsets for each key in a contiguous manner. The table can then be queried to identify the offset associated with the Nth key.

In some implementations, the header of a leaf block of the B+Tree may include various items of data. As a non-limiting example, the B+Tree leaf block may be configured as a fixed size header, which stores any combination of the following variables:

For "uint16_t key_size": If the keys have the same length, then the corresponding value may be set in the leaf block header. Otherwise, zero ("0") may be set for this variable in the header to indicate that the key sizes are different;

For "uint16_t value_size": Similar to the above, if the values have the same length, then the corresponding value can be set in this variable. Otherwise, zero ("0") may be set for this variable in the header to indicate that the values sizes associated with the keys are different;

For "int16_t offset_size": When the value of this variable is set to a positive value, then the offset size is the same for the keys. When the value is set to a negative value, then the offset size is different for each key. If the value is zero ("0"), then the offsets are the same as the key indices;

For "int8_t offset_type": If the offset type for the offsets is the same across the keys, then the offset type is set in this variable. Otherwise, zero ("0") may be set for this variable to indicate that the offset types of the offsets are different;

For "uint16_t num_keys": This variable represents the total number of key, value pairs in the leaf block;

For "uint16_t key_start": This variable represents the start offset of the keys;

For "uint16_t offse_t start": This variable represents the offset inside the leaf block from where the offsets start; and For "uint16_t value_start": This variable represents the offset inside the leaf block from where the list of values starts.

After the header of the leaf block of the B+Tree, the leaf block may be configured to store partially compressed, fully compressed, or fully expanded information about the list of keys starting from the "key_start" offset. Following the list of keys, the values may be stored as an array starting from offset "value_start". It will be appreciated that the leaf block header is not limited to the exemplary variables listed above, and thus, more or fewer variables may be included in the leaf block header. While "uint16_t" represents a 16-bit unsigned integer, it will be appreciated that any type of integer may be a variable in the block header.

Key-index mapping system 230 may include one or more processors, on which executable code is stored. The executable code, when executed, may generate a data structure configured to contiguously store keys (or identifiers of keys) that are not stored contiguously. In some implementations, if the keys are not contiguous in a key space (e.g., the keys are not adjacent to each other in the key space), key-index mapping system 230 may perform a key comparison function. The key comparison function may evaluate two or more keys by comparing the "type" of the keys. If the "type" of the keys is the same across the keys, then the directory identifier is compared. If the directory identifier is the same between the keys, then the file offsets of the keys or other parts of the keys may be compared. The key comparison function groups keys with same "type" to contiguous locations in the B+Tree or in an address space. Within keys of the same type, the key comparison function may group the keys for the same directory identifier and the same object identifier together in a contiguous location, such as a table in an address space.

In some implementations, if the offsets do not match the ordinal key index (e.g., if the offsets are not stored adjacently in the key space), then the offsets may be stored as an array of <offset length, offset of offset> values, followed by the offsets. If the offsets are of the same size, then key-index mapping system 230 may store the offset length in the header without storing the "offset length" value or the "offset of the offset" value in the array.

When the keys cannot be compressed according to the techniques described above or when the keys are of variable sizes, key-index mapping system 230 may generate a key table that stores the keys in a contiguous manner. The key table may include an array of <offset>, <key length>, <value offset>, <value length>. In some implementations, each array element may be 16 bits in length, and thus, the overhead for a key-value pair may be 8 bytes. When the keys in the leaf block are the same size, then the "key_size" field in the leaf block header may be set to the size of the key. In this example, the value for the key size is not stored in the leaf block because the header indicates that the key size is the same for the keys, and thus, space is utilized efficiently. It will be appreciated that the space utilization techniques describe herein may also apply to the values (e.g., the pointer to the data block corresponding to the key) associated with the keys. For example, if a value associated with a key is compressible, then the space utilization techniques that are applied to keys and described herein may also be applicable to the values.

Figure 3:
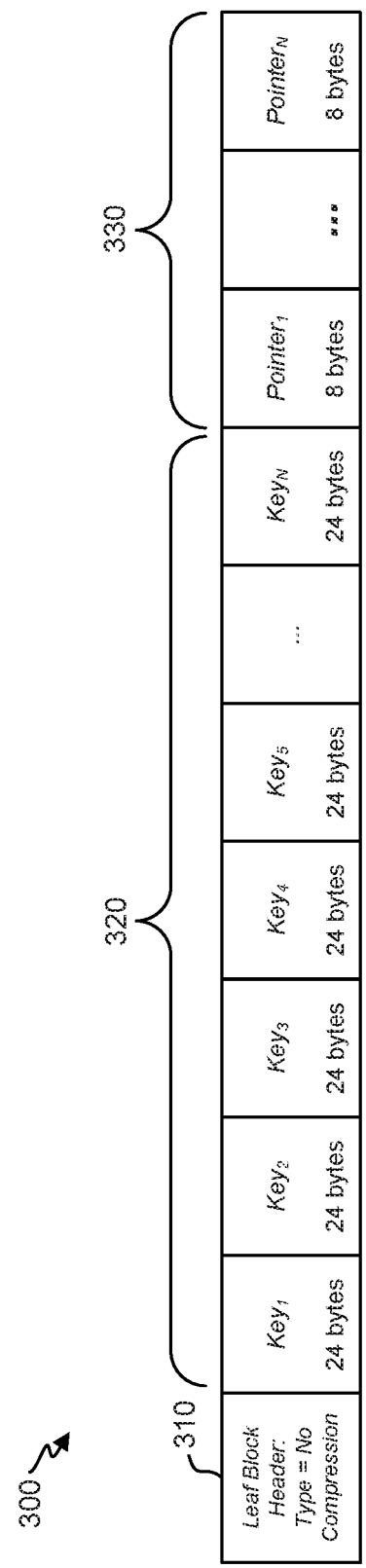
FIG. 3 illustrates an example of a B+Tree block without key compression.

FIGS. 3-6 are diagrams illustrating examples of B+Tree leaf blocks, in which space utilization is enhanced, according to some aspects of the present disclosure. FIG. 3 illustrates leaf block 300, in which a group of keys 320 is stored without key compression. Each key in the group of keys 320 may be associated with a pointer in the group of pointers 330. For example, $Key_1$ and $Pointer_1$ may be a key-value pair stored in leaf block 300. In leaf block header 310, the "type" value, which represents the compression state of the keys in the leaf block, may be set to a value indicating that the keys are not compressed. Without key compression, $Key_1$ through $Key_N$ may each be stored in full in leaf block 300. Each key of $Key_1$ through $Key_N$ may be 24 bytes when stored in full. For example, $Key_1$ may include a file identifier of 8 bytes, an object identifier of 8 bytes, and a file offset of 8 bytes, which is a total of 24 bytes.

Figure 4:
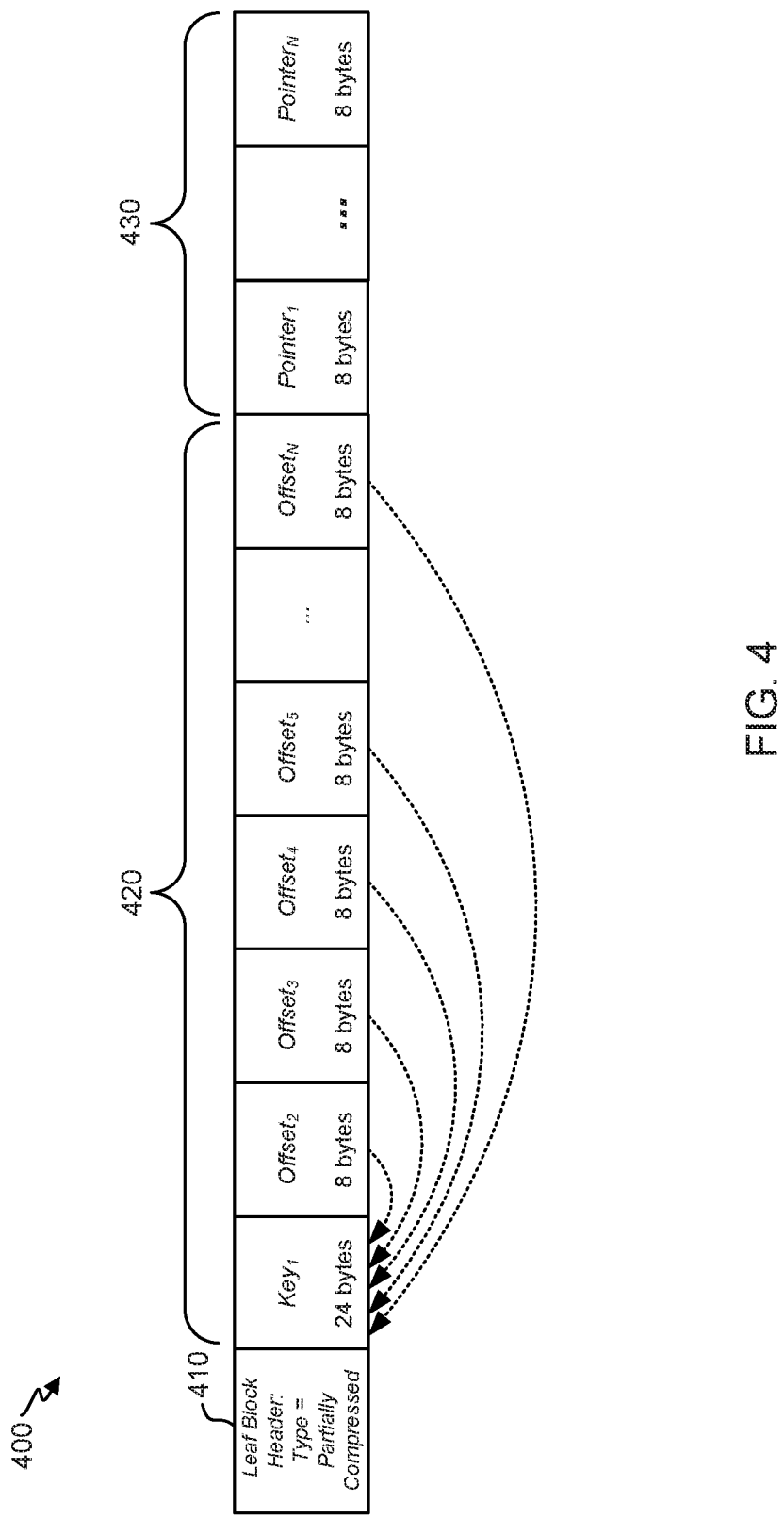
FIG. 4 illustrates an example of a B+Tree block with partial key compression, according to some aspects of the present disclosure.

Certain aspects and features of the present disclosure relate to partially compressing the keys stored in a leaf block to improve the space utilization of keys in a B+Tree. FIG. 4 illustrates an example of leaf block 400, in which keys are partially compressed according to aspects of the present disclosure. Similar to leaf block 300, each key in the group of keys 420 may be associated with a pointer in the group of pointers 430. Leaf block header 410 of leaf block 400 may include a "type" value, which indicates that the keys stored in leaf block 400 are partially compressed.

Partial compression of keys may be implemented by only storing $Key_1$ in full (e.g., 24 bytes) and storing each subsequent key (e.g., $Key_2$ through $Key_N$) as an offset from $Key_1$. In doing so, $Key_2$ through $Key_N$ are not stored in full. Partial compression can be performed when the keys are contiguous and when the offset size is smaller than the size of each key. Since the group of keys 420 is stored contiguously, the file identifier (8 bytes) and the object identifier (8 bytes) of each of $Key_2$ through $Key_N$ are not stored in leaf block 400. Rather, the file identifier and object identifier for each of $Key_2$ through $Key_N$ are the same as $Key_1$, which is stored in full. As can be seen from FIG. 4, $Key_2$ through $Key_N$ are each stored as 8 byte offsets, which improves space utilization of each key by 16 bytes. It will be appreciated that the offset size of 8 bytes is a non-limiting example, and thus, the keys or the offsets of the keys may be any size.

Figure 5:
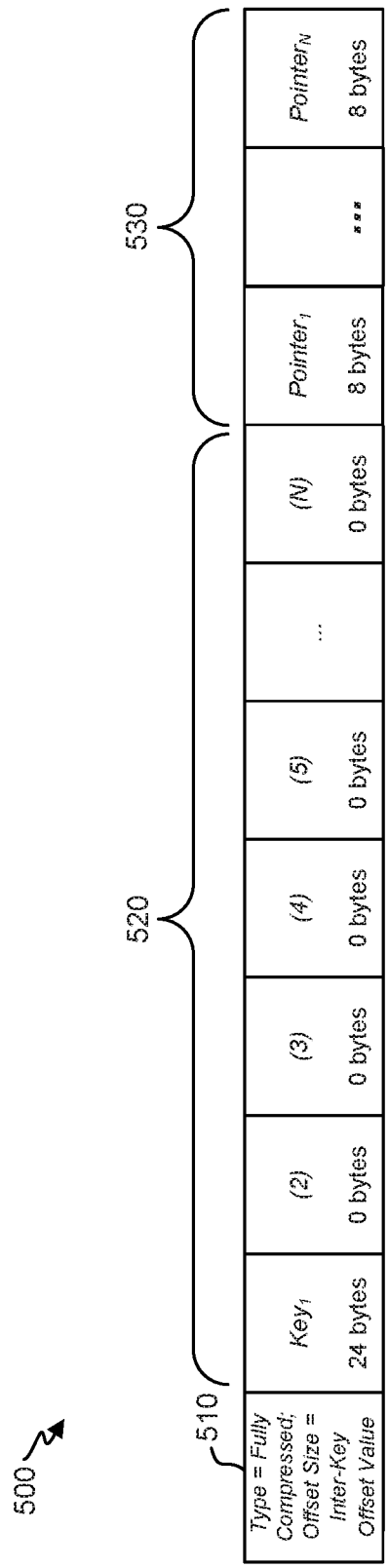
FIG. 5 illustrates an example of a B+Tree block with full key compression, according to some aspects of the present disclosure.

Certain aspects and features of the present disclosure also relate to fully compressing the keys stored in a leaf block to improve the space utilization of keys in a B+Tree. FIG. 5 illustrates an example of leaf block 500, in which keys are fully compressed according to aspects of the present disclosure. Similar to leaf blocks 300 and 400, each key in the group of keys 520 may be associated with a pointer in the group of pointers 530. A pointer may store the location of a data block that stores the portion of the file associated with the corresponding key. Leaf block header 510 of leaf block 500 may include a "type" value, which indicates that the keys stored in leaf block 500 are fully compressed.

Full compression of keys may be implemented by only storing $Key_1$ in full (e.g., 24 bytes) and not storing the offset of each subsequent key (e.g., $Key_2$ through $Key_N$) in leaf block 500. Instead, the "type" value stored in leaf block header 510 may indicate that the offsets for $Key_2$ through $Key_N$ match the ordinal key index, according to which the group of keys 520 is arranged. That is, when the "type" value included in the leaf block header 510 is set to a predefined value, such as "1," for example, the subsequent keys are implicitly represented by the ordinal key index, and thus, the subsequent keys are not stored in full and are not stored as an offset. For example, each of $Key_2$ through $Key_N$ is not stored in full and is not stored as an offset. Instead, as illustrated in FIG. 5, each key of $Key_2$ through $Key_N$ can be represented by zero bytes because the "type" value included in the leaf block header 510 indicates that each key in the leaf block 500 is implicitly represented by the ordinal key index position of that key within the group of keys 520. For example, $Key_2$ is implicitly stored in leaf block 500 without needing to store $Key_2$ in full and without needing to store the offset of $Key_2$. Querying for $Key_2$ stored in leaf block 500 may include identifying the ordinal key index position of $Key_2$ (e.g., "2"), determining a result by multiplying the ordinal key index position by the offset_size (e.g., 2 times 4 KB), and executing the key addition function with $Key_1$ and the result as inputs to reconstruct $Key_2$. In addition, the leaf block header 510 also stores a value (e.g., "0"), which indicates whether or not the offsets of each subsequent key are the same size.

Each key of $Key_2$ through $Key_N$ can be fully compressed when the keys are contiguous, when the offset size is smaller than the size of each key, and when the offset size of the offset for each subsequent key is the same size. The constant offset values between the keys may be stored in the leaf block header. The number of bits devoted to representing the differences may be defined and included in the leaf block header (e.g., 8 bytes). In FIG. 5, the group of keys 520 is stored contiguously, the offset size is smaller than the size of the full key for each $Key_2$ through $Key_N$, and the offset size for each of $Key_2$ through $Key_N$ is the same (e.g., 4 KB). Thus, the file identifier (8 bytes), the object identifier (8 bytes) of each of $Key_2$ through $Key_N$, and the offset associated with each key of $Key_2$ through $Key_N$ are not stored in leaf block 500. Rather, the file identifier, the object identifier for each of $Key_2$ through $Key_N$, and the offset for each of $Key_2$ through $Key_N$ can be generated from $Key_1$, the ordinal key index position of the key, and the offset size (which is stored in the leaf block header 510) using the key addition function. As can be seen from FIG. 5, $Key_2$ through $Key_N$ are each implicitly stored in leaf block 500 and take up 0 bytes, which improves space utilization of each key by 24 bytes for each subsequent key.

In some implementations, the leaf block 500 may store file offsets of a file layout tree. To illustrate and only as a non-limiting example, before the space utilization techniques are applied, leaf block 500 may store the first key [10 (e.g., the file identifier and object identifier), 0 (e.g., the file offset)]; the second key [10, 4 KB (e.g., the next file offset)]; the third key [10, 4 KB*2 (e.g., the next file offset)]; the fourth key [10, 4 KB*3 (e.g., the next file offset)]; and so on.

According to certain implementation described herein, the file identifier may only be stored in the leaf block 500 once (e.g., when storing the first key in full) and not in the subsequent keys stored in the leaf block 500 (e.g., the file identifier may be stored elsewhere in a single location and referenced later). Further, the file offset (e.g., in 4 KB increments) may also be removed from each key starting with the second key onwards because the offset is implied or encoded using the ordinal key index, which represents the order with which the group of keys 520 is arranged.

When a new key is inserted or delated, the leaf block header 510 may automatically be updated. For example, if the keys are contiguous, but a key is deleted from the leaf block 500, then for the keys after the deleted key, the offsets may no longer match the ordinal key index (e.g., the arrangement of keys in the leaf block 500 may not match the arrangement of keys in group of keys 520). In this example, the leaf block header 510 may be automatically changed. For instance, the "type" value stored in the leaf block header 510 may no longer indicate that the subsequent keys are implicitly stored because the keys would no longer be contiguous.

Figure 6:
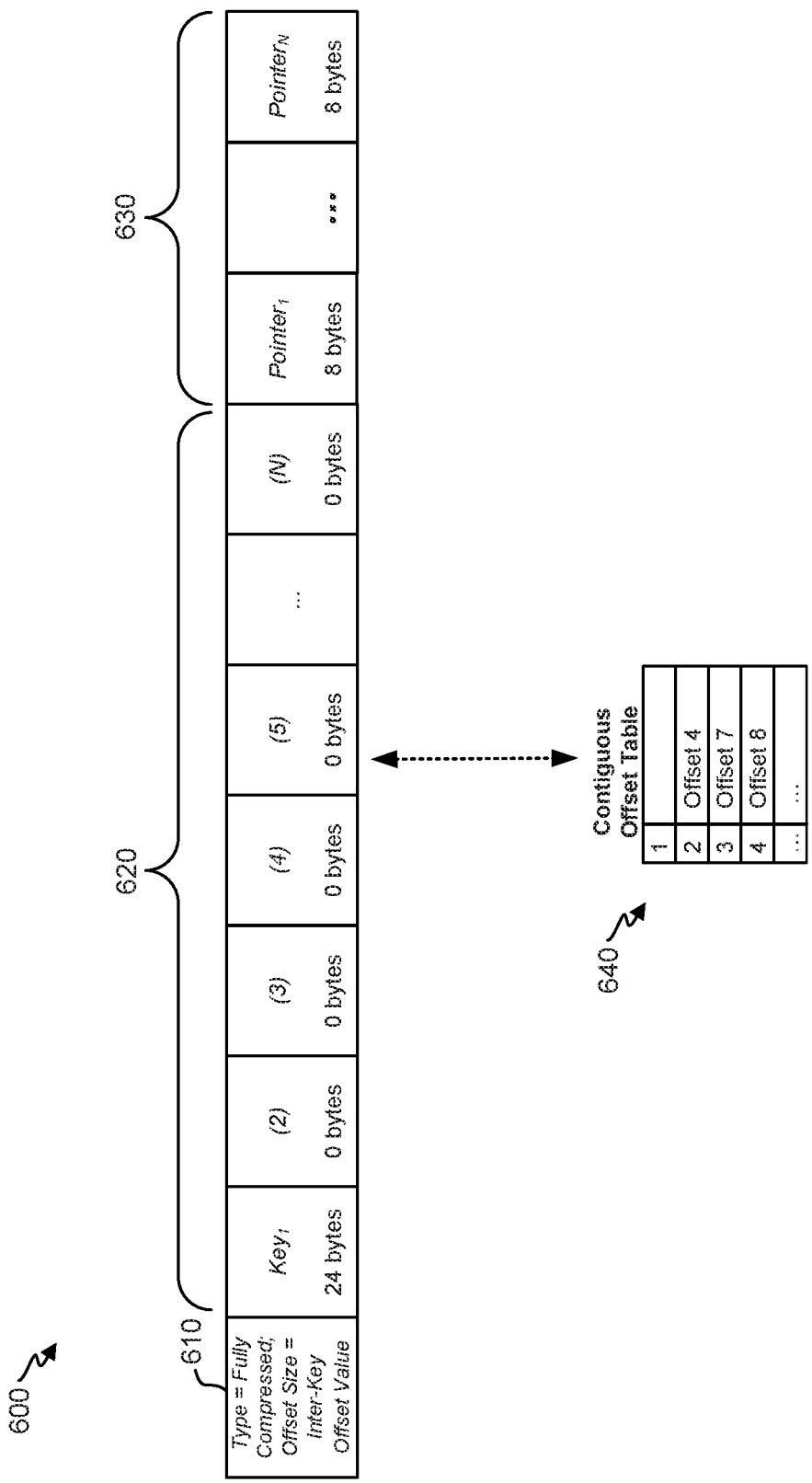
FIG. 6 illustrates an example of a B+Tree block with full key compression, in which the keys are not contiguous, according to some aspects of the present disclosure.

Certain aspects and features of the present disclosure also relate to fully compressing the keys stored in a leaf block, even if the keys are not contiguous. FIG. 6 illustrates an example of leaf block 600, in which keys are fully compressed, even though the keys are not contiguous, according to aspects of the present disclosure. Leaf block 600 may include leaf block header 610, which stores metadata characterizing the leaf block 600. Similar to leaf blocks 300, 400, and 500, each key in the group of keys 620 may be associated with a pointer in the group of pointers 630.

In FIG. 6, the keys may not be contiguous. When the keys are not contiguous, file system 120 (e.g., using key-index mapping system 230) may create contiguous offset table 640 to store the offsets of the non-contiguous keys in a contiguous manner. For example, key-index mapping system 230 may perform the key comparison function to group the keys and store the keys contiguously in contiguous offset table 640. As can be seen in FIG. 6, the contiguous offset table 640 stores offset 4, offset 7, and offset 8 (which are not contiguous) in a contiguous manner in rows 2, 3, and 4 respectively. In some implementations, when the offsets are not contiguous, then the offsets may be stored contiguous in a table as an array of <offset length, offset of offset>, followed by the actual offsets. If the offsets are of same size, then file system 120 stores the offset length in the leaf block header 610.

In some implementations, the key comparison function may evaluate two or more keys by comparing the type of the keys. If the type of the keys is the same, then the directory identifier is compared. If the directory identifier is the same between the keys, then the offsets of the keys or other parts of the keys are compared. The key comparison groups keys of the same type to contiguous locations. Within keys of the same type, the key comparison function groups the keys for the same directory identifier and the same object identifier together in a contiguous location. Thus, the keys, which originally were not contiguous, now are stored contiguously in contiguous offset table, for example. As a result, the non-contiguous keys are be stored in leaf block 600 in a fully compressed manner by referencing the contiguously stored keys in contiguous offset table 640.

Figure 7:
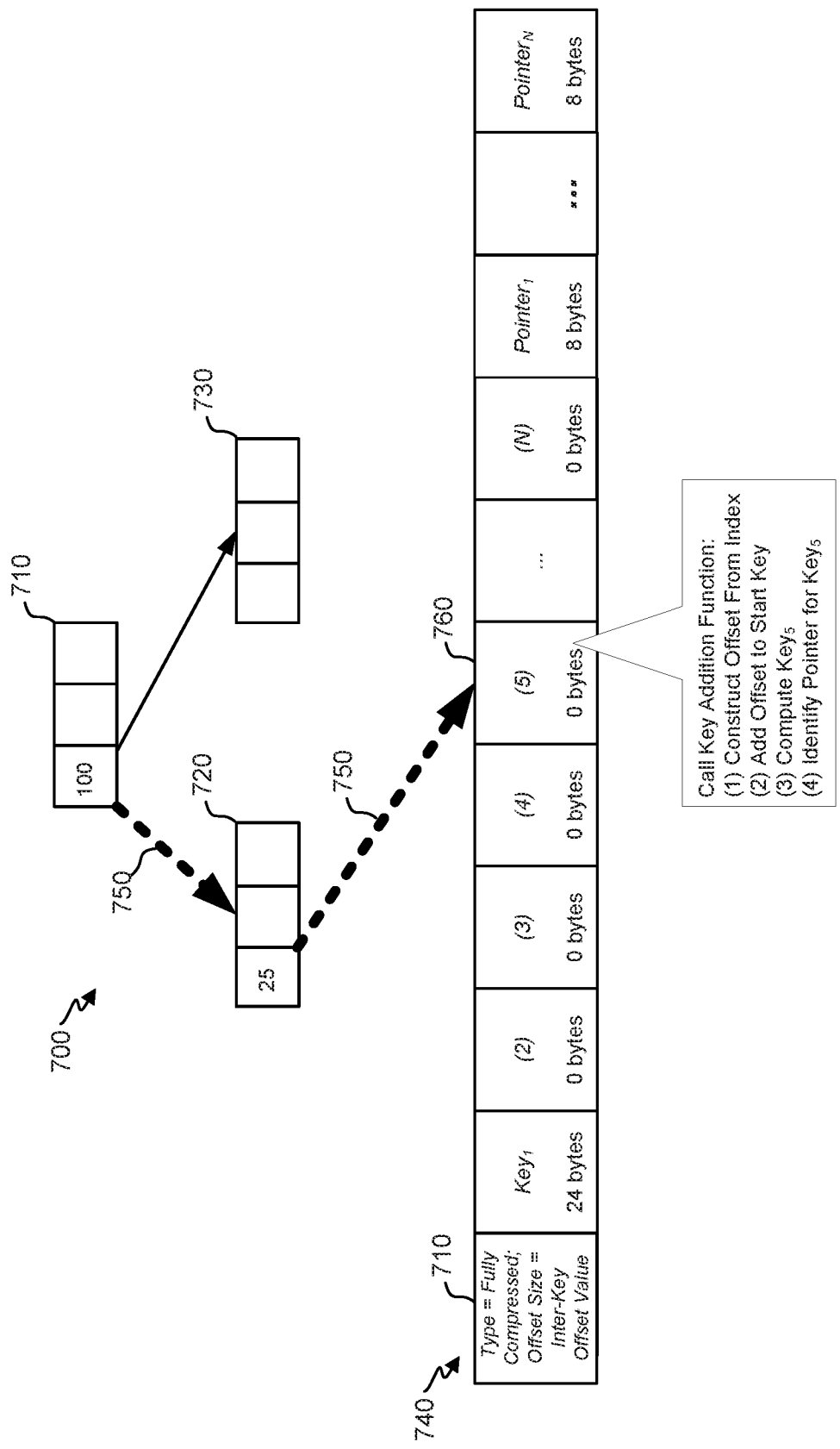
FIG. 7 illustrates an example of querying a B+Tree block that stores keys in a fully compressed manner, according to some aspects of the present disclosure.

FIG. 7 illustrates an example of querying for a key stored in B+Tree block 740, which stores keys in a fully compressed manner, according to some aspects of the present disclosure. B+Tree 700 may include at least blocks 710, 720, and 730 and leaf block 740. B+Tree 700 may include one or more other blocks for storing keys, but those blocks are not shown here to simplify FIG. 7. Leaf block 740 may be configured to store $Key_2$ through $Key_N$ in a fully compressed manner, as described with respect to FIG. 5. Further, leaf block header 710 may store a "type" value indicating that $Key_2$ through $Key_N$ are implicitly stored in leaf block 740 according to the ordinal key index of the group of keys.

As an illustration of querying B+Tree 700 for a pointer associated with a fully compressed key, Key 760 may be the $30^{th}$ key of the group of keys stored in B+Tree 700. File system 120 may query B+Tree 700 for the pointer that corresponds to the $30^{th}$ key. Further, Key 760 may be the fifth key stored in leaf block 740. Accordingly, the ordinal key index position of Key 760 may be "5" in leaf block 740. Querying for the pointer associated with the 30th key may include a comparison step 750, which compares "30" with "100" stored in block 710 to determine which child block to select between blocks 720 and 730. Block 720 may be selected for further searching because "30" is less than "100" and the keys below the 100th key are referenced by block 720. Next, another comparison step 750 may be performed by comparing "30" with "25" stored in block 720 to determine which leaf block to select. Since "30" is greater than "25," leaf block 740 may be selected for further searching because leaf block 740 stores the keys (and the corresponding pointers) that are greater than the 25th key but less than the $100^{th}$ key. The key range stored in block 740 may be determined by evaluating the leaf block header 710. To reconstruct the Key 760, the key additional function may be called. The key addition function may include identifying the ordinal key index position of Key 760 in leaf block 740; extracting the offset size from the leaf block header 710; generating the offset for Key 760 by multiplying the ordinal key index position by the offset size; adding the offset to $Key_1$ in leaf block 740 to generate Key 760; and then identifying the pointer that corresponds to Key 760.

Figure 8:
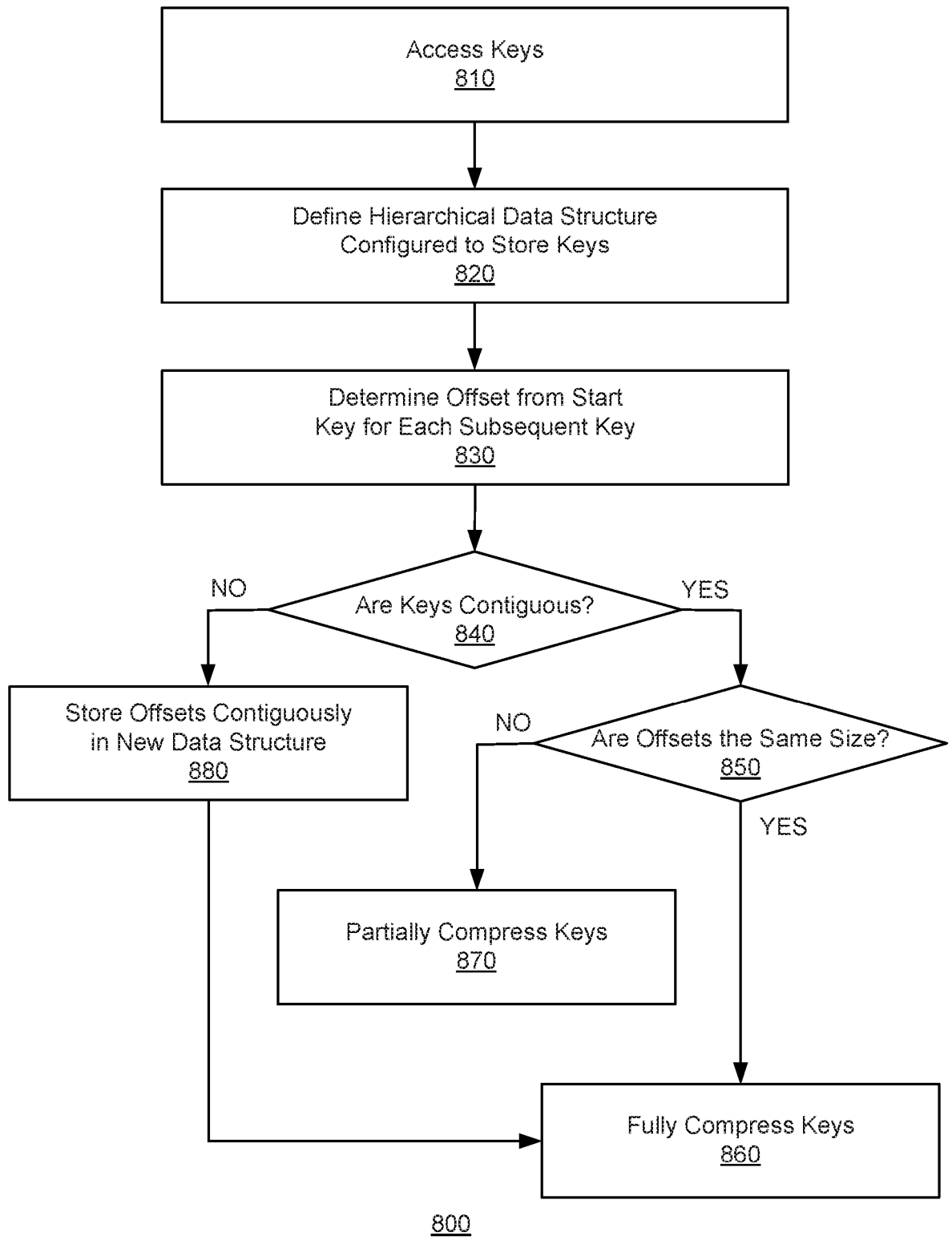
FIG. 8 is a flowchart illustrating a process for compressing keys for storing in a B+Tree block, according to some aspects of the present disclosure.

FIG. 8 is a flowchart illustrating an example of process 800 for compressing keys for storage in a B+Tree, according to some aspects of the present disclosure. In some implementations, process 8800 may be performed by any component described in FIGS. 1-2. For example, process 800 may be performed by file system 120 and any of the corresponding sub-components. Further, as a non-limiting example, process 800 may be performed to enhance space utilization of storing keys by partially or fully compressing the keys.

For example, process 800 may begin at block 810, where file system 120 may define the keys, such as keys associated with a particular file or directory. The keys may be stored in a single location (e.g., within a separate file or key space) or multiple locations (e.g., within multiple separate files or multiple key spaces). Further, the keys may include a start key (e.g., the first key in a group of keys) and one or more subsequent keys. At block 820, hierarchical data structure generator 220 may define a hierarchical data structure configured to store the keys in a compressed manner. In some implementations, the hierarchical data structure may be a B+Tree data structure. It will be appreciated that the hierarchical data structure is not limited to a B+Tree. Other data structures may be used, such as B-Trees, constant range maps, and other suitable file layout structures. At block 830, file system 120 may determine the offset between the start key and key subsequent key. For example, to generate the offsets, offset generator 210 may call the key difference function, which uses, as input, two keys (e.g., Key 1 and Key 2), and outputs the distance between the two keys. The distance between Key 1 and Key 2 represents the offset of Key 2.

At block 840, file system 120 may determine whether the keys are contiguous in a key space. In some implementations, the differences between keys can be encoded in space that file system 120 has set aside for the key difference values in the header (for full compression) or in individual entries (for partial compression). In some implementations, determining whether the keys are contiguous may include comparing the keys to determine whether they are adjacent (e.g., whether the keys progress one-after-the-other) or if they are stored in a fragmented manner with keys from other files stored between keys of the particular file. If "yes," then process 800 proceeds to block 850. At block 850, file system 120 may compare the offsets (generated at block 830) to determine whether the offsets are the same size. If "yes," then process 800 proceeds to block 860 where the keys (accessed at block 810) may be fully compressed and stored in one or more B+Tree leaf blocks, as described with respect to FIG. 5. If "no," then process 800 may proceed to block 870 where the keys are partially compressed and stored in one or more B+Tree leaf blocks, as described with respect to FIG. 4. Referring again to block 840, if the keys are not contiguous, then process 800 proceeds to block 880 where the offsets of the non-contiguous keys are stored in a contiguous manner in a new data structure (e.g., in contiguous offset table 640 stored in an address space). The non-contiguous keys can nonetheless be fully compressed by referring to the new data structure, which contiguously stores the non-contiguous keys when querying for the pointer associated with a key.

Figure 9:
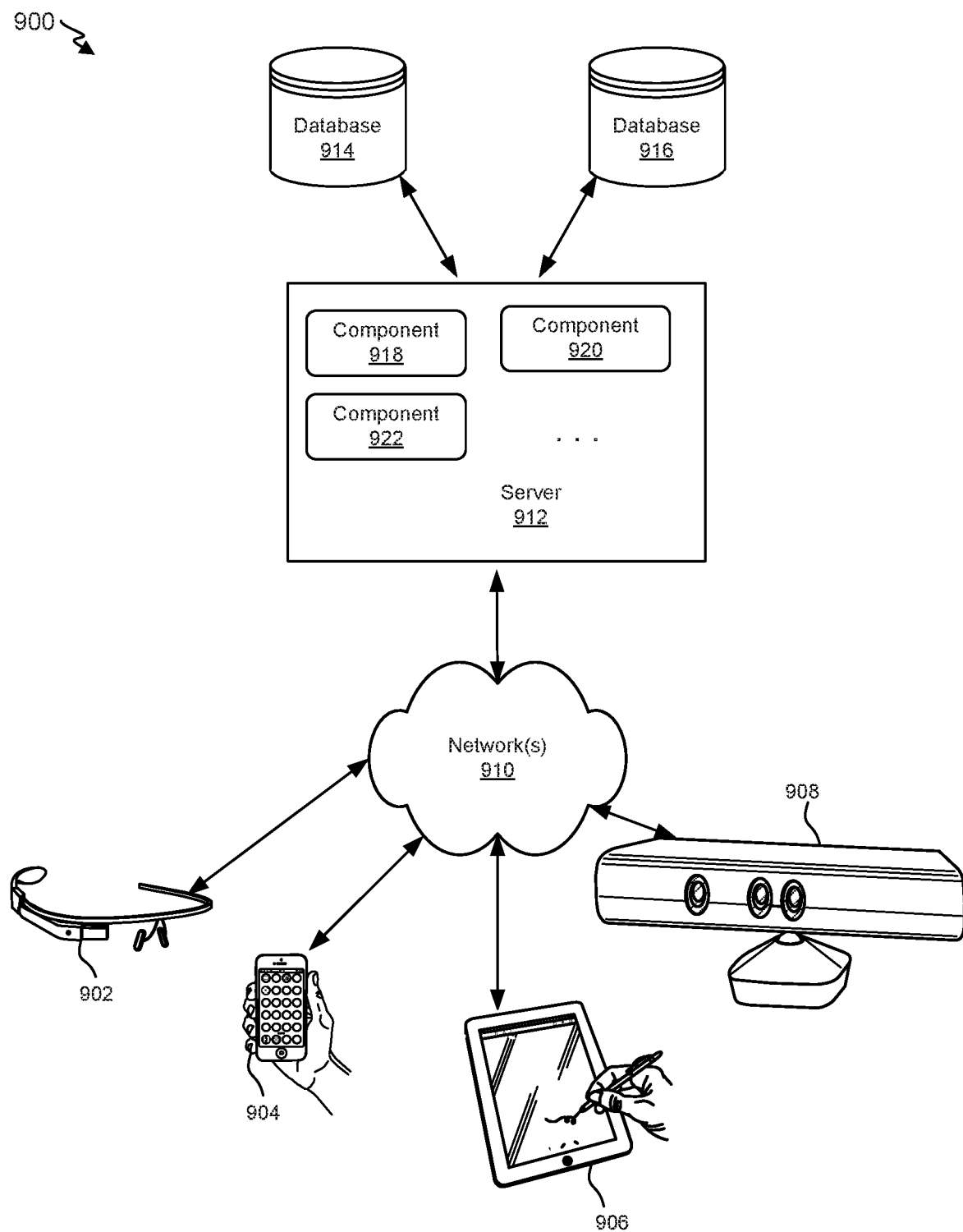
FIG. 9 is a simplified diagram illustrating a distributed system for implementing one of the embodiments.

FIG. 9 depicts a simplified diagram of a distributed system 900 for implementing one of the embodiments. In the illustrated embodiment, distributed system 900 includes one or more client computing devices 902, 904, 906, and 908, which are configured to execute and operate a client application such as a web browser, proprietary client (e.g., Oracle Forms), or the like over one or more network(s) 910. Server 912 may be communicatively coupled with remote client computing devices 902, 904, 906, and 908 via network 910.

In various embodiments, server 912 may be adapted to run one or more services or software applications provided by one or more of the components of the system. In some embodiments, these services may be offered as web-based or cloud services or under a Software as a Service (SaaS) model to the users of client computing devices 902, 904, 906, and/or 908. Users operating client computing devices 902, 904, 906, and/or 908 may in turn utilize one or more client applications to interact with server 912 to utilize the services provided by these components.

In the configuration depicted in the figure, the software components 918, 920 and 922 of system 900 are shown as being implemented on server 912. In other embodiments, one or more of the components of system 900 and/or the services provided by these components may also be implemented by one or more of the client computing devices 902, 904, 906, and/or 908. Users operating the client computing devices may then utilize one or more client applications to use the services provided by these components. These components may be implemented in hardware, firmware, software, or combinations thereof. It should be appreciated that various different system configurations are possible, which may be different from distributed system 900. The embodiment shown in the figure is thus one example of a distributed system for implementing an embodiment system and is not intended to be limiting.

Client computing devices 902, 904, 906, and/or 908 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 902, 904, 906, and 908 may be any other electronic device, such as a thin-client computer, an Internet-enabled gaming system (e.g., a Microsoft Xbox gaming console with or without a Kinect® gesture input device), and/or a personal messaging device, capable of communicating over network(s) 910.

Although exemplary distributed system 900 is shown with four client computing devices, any number of client computing devices may be supported. Other devices, such as devices with sensors, etc., may interact with server 912.

Network(s) 910 in distributed system 900 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 910 can be a local area network (LAN), such as one based on Ethernet, Token-Ring and/or the like. Network(s) 910 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 912 may be adapted to run one or more services or software applications described in the foregoing disclosure. For example, server 912 may correspond to a server for performing processing described above according to an embodiment of the present disclosure.

Server 912 may run an operating system including any of those discussed above, as well as any commercially available server operating system. Server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 912 may include one or more applications to analyze and consolidate data feeds and/or event updates received from users of client computing devices 902, 904, 906, and 908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 912 may also include one or more applications to display the data feeds and/or real-time events via one or more display devices of client computing devices 902, 904, 906, and 908.

Distributed system 900 may also include one or more databases 914 and 916. Databases 914 and 916 may reside in a variety of locations. By way of example, one or more of databases 914 and 916 may reside on a non-transitory storage medium local to (and/or resident in) server 912. Alternatively, databases 914 and 916 may be remote from server 912 and in communication with server 912 via a network-based or dedicated connection. In one set of embodiments, databases 914 and 916 may reside in a storage-area network (SAN). Similarly, any necessary files for performing the functions attributed to server 912 may be stored locally on server 912 and/or remotely, as appropriate. In one set of embodiments, databases 914 and 916 may include relational databases, such as databases provided by Oracle, that are adapted to store, update, and retrieve data in response to SQL-formatted commands.

Figure 10:
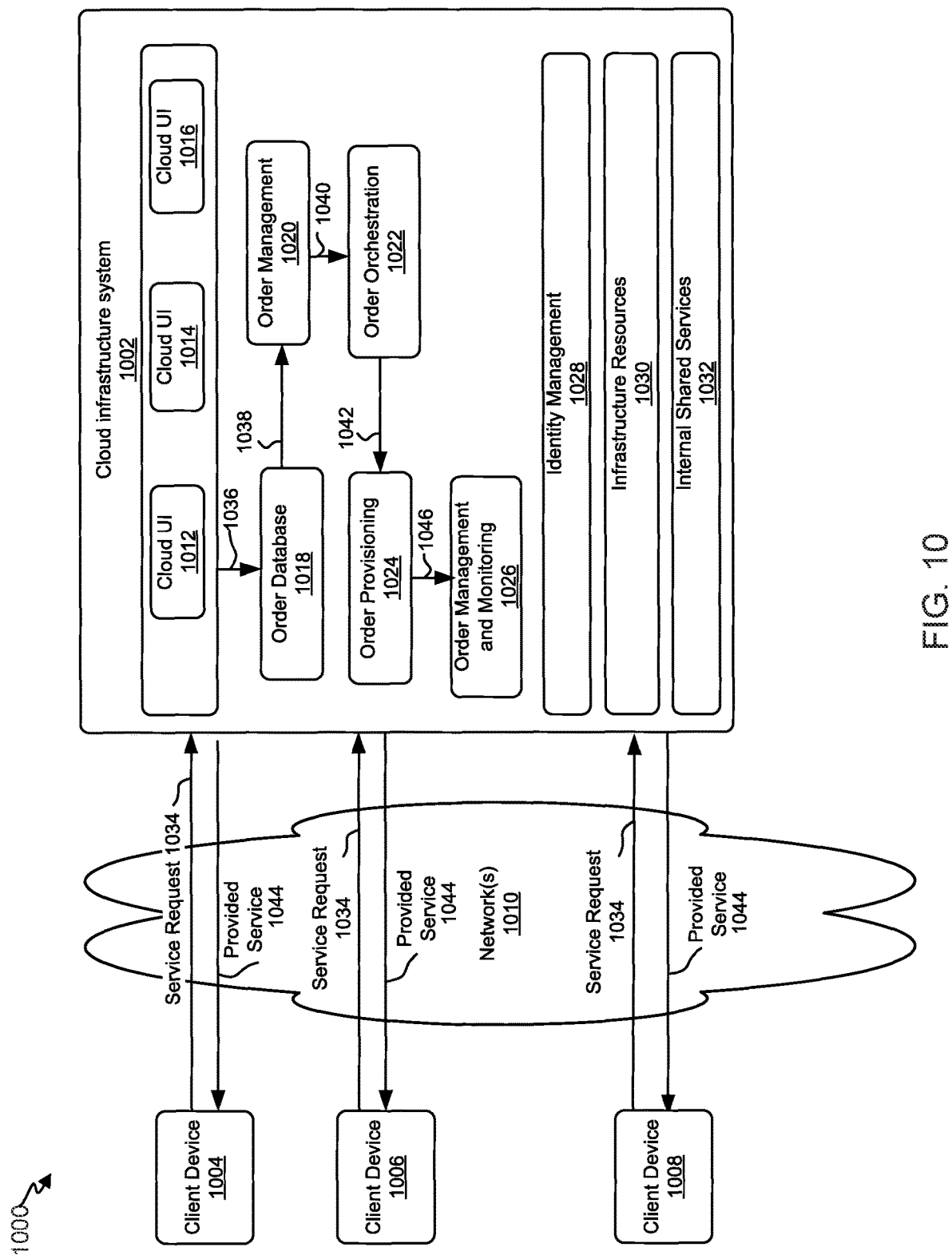
FIG. 10 is a simplified block diagram illustrating one or more components of a system environment.

FIG. 10 is a simplified block diagram of one or more components of a system environment 1000 by which services provided by one or more components of an embodiment system may be offered as cloud services, in accordance with an embodiment of the present disclosure. In the illustrated embodiment, system environment 1000 includes one or more client computing devices 1004, 1006, and 1008 that may be used by users to interact with a cloud infrastructure system 1002 that provides cloud services. The client computing devices may be configured to operate a client application such as a web browser, a proprietary client application (e.g., Oracle Forms), or some other application, which may be used by a user of the client computing device to interact with cloud infrastructure system 1002 to use services provided by cloud infrastructure system 1002.

It should be appreciated that cloud infrastructure system 1002 depicted in the figure may have other components than those depicted. Further, the embodiment shown in the figure is only one example of a cloud infrastructure system that may incorporate an embodiment of the invention. In some other embodiments, cloud infrastructure system 1002 may have more or fewer components than shown in the figure, may combine two or more components, or may have a different configuration or arrangement of components.

Client computing devices 1004, 1006, and 1008 may be devices similar to those described above for 902, 904, 906, and 908.

Although exemplary system environment 1000 is shown with three client computing devices, any number of client computing devices may be supported. Other devices such as devices with sensors, etc. may interact with cloud infrastructure system 1002.

Network(s) 1010 may facilitate communications and exchange of data between clients 1004, 1006, and 1008 and cloud infrastructure system 1002. Each network may be any type of network familiar to those skilled in the art that can support data communications using any of a variety of commercially-available protocols, including those described above for network(s) 910.

Cloud infrastructure system 1002 may comprise one or more computers and/or servers that may include those described above for server 912.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1002 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1002 may be adapted to automatically provision, manage and track a customer's subscription to services offered by cloud infrastructure system 1002. Cloud infrastructure system 1002 may provide the cloud services via different deployment models. For example, services may be provided under a public cloud model in which cloud infrastructure system 1002 is owned by an organization selling cloud services (e.g., owned by Oracle) and the services are made available to the general public or different industry enterprises. As another example, services may be provided under a private cloud model in which cloud infrastructure system 1002 is operated solely for a single organization and may provide services for one or more entities within the organization. The cloud services may also be provided under a community cloud model in which cloud infrastructure system 1002 and the services provided by cloud infrastructure system 1002 are shared by several organizations in a related community. The cloud services may also be provided under a hybrid cloud model, which is a combination of two or more different models.

In some embodiments, the services provided by cloud infrastructure system 1002 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1002. Cloud infrastructure system 1002 then performs processing to provide the services in the customer's subscription order.

In some embodiments, the services provided by cloud infrastructure system 1002 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various cloud applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1002 may also include infrastructure resources 1030 for providing the resources used to provide various services to customers of the cloud infrastructure system. In one embodiment, infrastructure resources 1030 may include pre-integrated and optimized combinations of hardware, such as servers, storage, and networking resources to execute the services provided by the PaaS platform and the SaaS platform.

In some embodiments, resources in cloud infrastructure system 1002 may be shared by multiple users and dynamically re-allocated per demand. Additionally, resources may be allocated to users in different time zones. For example, cloud infrastructure system 1030 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1032 may be provided that are shared by different components or modules of cloud infrastructure system 1002 and by the services provided by cloud infrastructure system 1002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1002 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1002, and the like.

In one embodiment, as depicted in the figure, cloud management functionality may be provided by one or more modules, such as an order management module 1020, an order orchestration module 1022, an order provisioning module 1024, an order management and monitoring module 1026, and an identity management module 1028. These modules may include or be provided using one or more computers and/or servers, which may be general purpose computers, specialized server computers, server farms, server clusters, or any other appropriate arrangement and/or combination.

In exemplary operation 1034, a customer using a client device, such as client device 1004, 1006 or 1008, may interact with cloud infrastructure system 1002 by requesting one or more services provided by cloud infrastructure system 1002 and placing an order for a subscription for one or more services offered by cloud infrastructure system 1002. In certain embodiments, the customer may access a cloud User Interface (UI), cloud UI 1012, cloud UI 1014 and/or cloud UI 1016 and place a subscription order via these UIs. The order information received by cloud infrastructure system 1002 in response to the customer placing an order may include information identifying the customer and one or more services offered by the cloud infrastructure system 1002 that the customer intends to subscribe to.

After an order has been placed by the customer, the order information is received via the cloud UIs, 1012, 1014 and/or 1016.

At operation 1036, the order is stored in order database 1018. Order database 1018 can be one of several databases operated by cloud infrastructure system 1018 and operated in conjunction with other system elements.

At operation 1038, the order information is forwarded to an order management module 1020. In some instances, order management module 1020 may be configured to perform billing and accounting functions related to the order, such as verifying the order, and upon verification, booking the order.

At operation 1040, information regarding the order is communicated to an order orchestration module 1022. Order orchestration module 1022 may utilize the order information to orchestrate the provisioning of services and resources for the order placed by the customer. In some instances, order orchestration module 1022 may orchestrate the provisioning of resources to support the subscribed services using the services of order provisioning module 1024.

In certain embodiments, order orchestration module 1022 enables the management of processes associated with each order and applies logic to determine whether an order should proceed to provisioning. At operation 1042, upon receiving an order for a new subscription, order orchestration module 1022 sends a request to order provisioning module 1024 to allocate resources and configure those resources needed to fulfill the subscription order. Order provisioning module 1024 enables the allocation of resources for the services ordered by the customer. Order provisioning module 1024 provides a level of abstraction between the cloud services provided by cloud infrastructure system 1000 and the physical implementation layer that is used to provision the resources for providing the requested services. Order orchestration module 1022 may thus be isolated from implementation details, such as whether or not services and resources are actually provisioned on the fly or pre-provisioned and only allocated/assigned upon request.

At operation 1044, once the services and resources are provisioned, a notification of the provided service may be sent to customers on client devices 1004, 1006 and/or 1008 by order provisioning module 1024 of cloud infrastructure system 1002.

At operation 1046, the customer's subscription order may be managed and tracked by an order management and monitoring module 1026. In some instances, order management and monitoring module 1026 may be configured to collect usage statistics for the services in the subscription order, such as the amount of storage used, the amount data transferred, the number of users, and the amount of system up time and system down time.

In certain embodiments, cloud infrastructure system 1000 may include an identity management module 1028. Identity management module 1028 may be configured to provide identity services, such as access management and authorization services in cloud infrastructure system 1000. In some embodiments, identity management module 1028 may control information about customers who wish to utilize the services provided by cloud infrastructure system 1002. Such information can include information that authenticates the identities of such customers and information that describes which actions those customers are authorized to perform relative to various system resources (e.g., files, directories, applications, communication ports, memory segments, etc.) Identity management module 1028 may also include the management of descriptive information about each customer and about how and by whom that descriptive information can be accessed and modified.

Figure 11:
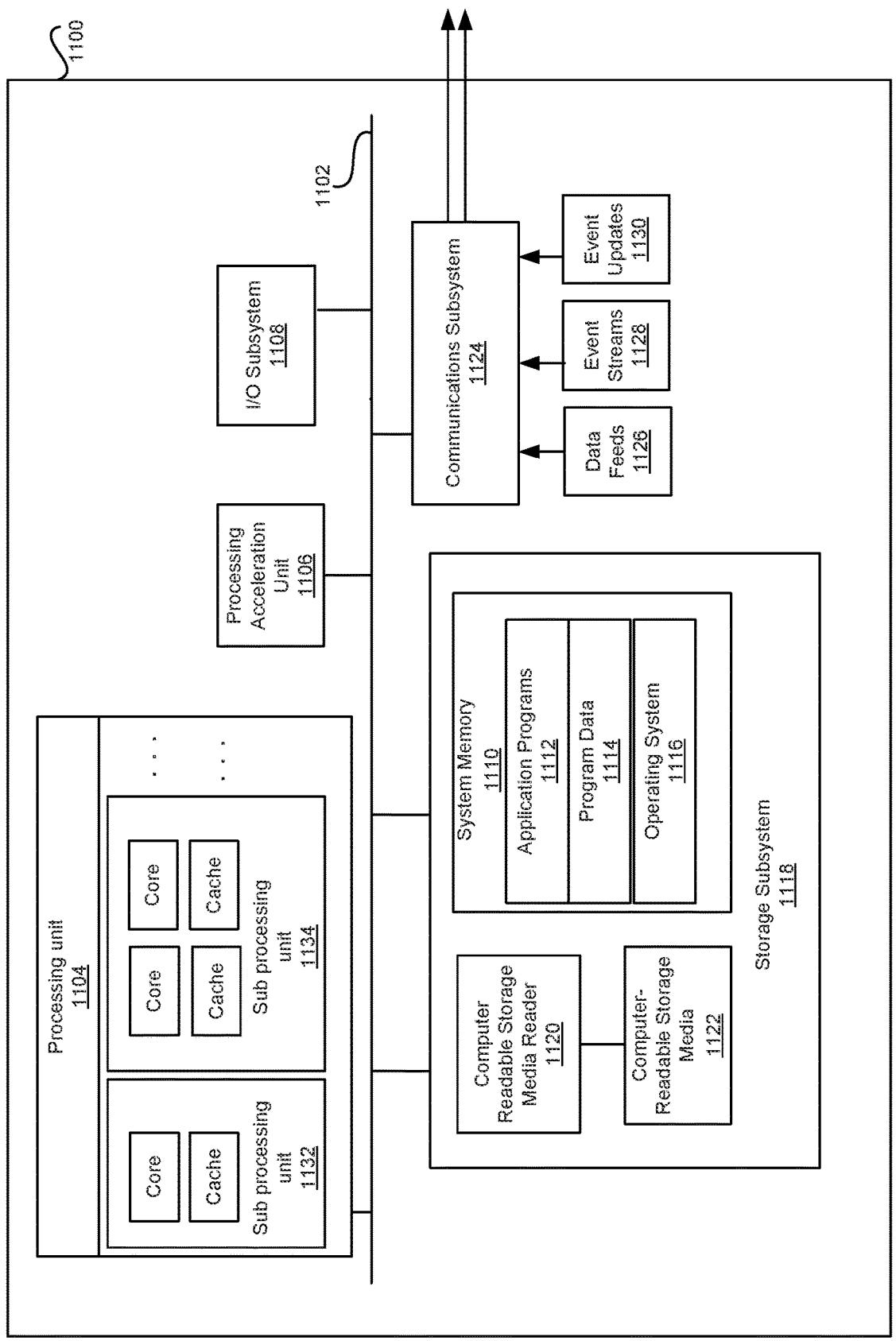
FIG. 11 illustrates an exemplary computer system, in which various embodiments of the present invention may be implemented.

FIG. 11 illustrates an exemplary computer system 1100, in which various embodiments of the present invention may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with the present invention.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 924 may enable computer system 1100 to connect to one or more devices via the Internet. In some embodiments communications subsystem 1124 can include radio frequency (RF)

transceiver components for accessing wireless voice and/or data networks (e.g., using cellular telephone technology, advanced data network technology, such as 3G, 4G or EDGE (enhanced data rates for global evolution), WiFi (IEEE 1202.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A file system, comprising:
one or more processors; and
a non-transitory computer-readable storage medium containing instructions which, when executed on the one or more processors, cause the one or more processors to perform operations including:
  accessing a set of keys, each key of the set of keys being associated with a pointer to one or more data blocks of a block-oriented storage device, the set of keys being arranged according to an ordinal key index, and the set of keys including a start key being first from amongst the set of keys;
  defining a hierarchical data structure configured to store the set of keys, the hierarchical data structure including a leaf block, the leaf block being configured to store a first subset of keys of the set of keys according to the ordinal key index;
  storing first one or more keys of the first subset of keys in the leaf block, the first one or more keys including at least the start key;
  determining a set of offsets, each offset of the set of offsets corresponding to a key of the first subset of keys;
  determining whether the first subset of keys is contiguous;
  in response to determining that the first subset of keys is contiguous, compressing the first subset of keys by storing one or more first offsets of the set of offsets in the leaf block, the one or more first offsets corresponding to second one or more keys of the first subset of keys; and
  in response to determining that the subset of the set of keys are not contiguous, compressing the first subset of keys by storing one or more second offsets of the set of offsets in the leaf block in a new data structure including a set of records, the one or more second offsets being contiguous in the new data structure, and each record of the set of records of the new data structure including a key after the start key of the first subset of the set of keys and the associated offset of the key.

2. The file system of claim 1, wherein determining the set of offsets further comprises comparing the start key with each other key of the first subset of keys, wherein each offset of the set of offsets corresponds to a difference between the start key and a subsequent key of the first subset of keys.

3. The file system of claim 2, wherein each particular offset of the one or more offsets are stored:
as a partial keys corresponding to the difference between the start key and a subsequent key of the first subset of keys in the leaf block subsequent to the start key, according to the ordinal key index.

4. The file system of claim 1, wherein the operation of compressing the first subset of the set of keys further comprises:
determining that each offset of the set of offsets has a same size; and
in response to determining that each offset of the set of offsets has a same size, storing one offset of the one or more offsets in a header of the leaf block, the one offset of the one or more offsets indicating the offset for each key of the first subset of keys is the same size and is based on the ordinal key index.

5. The file system of claim 4, wherein the ordinal key index and the one offset of the one or more offsets implicitly represent each key of the third subset of keys.

6. The file system of claim 1, wherein the hierarchical data structure is a B+Tree, wherein each key of the subset of the set of keys represents a file offset of a file, and wherein the B+Tree is used to store a file layout tree representing the file.

7. A computer-implemented method comprising:
accessing a set of keys, each key of the set of keys being associated with a pointer to one or more data blocks of a block-oriented storage device, the set of keys being arranged according to an ordinal key index, and the set of keys including a start key being first from amongst the set of keys;
defining a hierarchical data structure configured to store the set of keys, the hierarchical data structure including a leaf block, the leaf block being configured to store a first subset of keys of the set of keys according to the ordinal key index;
storing first one or more keys of the first subset of keys in the leaf block, the first one or more keys including at least the start key;
determining a set of offsets, each offset of the set of offsets corresponding to a key of the first subset of keys;
determining whether the first subset of keys is contiguous;
in response to determining that the first subset of keys is contiguous, compressing the first subset of keys by storing one or more first offsets of the set of offsets in the leaf block, the one or more first offsets corresponding to second one or more keys of the first subset of keys; and
in response to determining that the subset of the set of keys are not contiguous, compressing the first subset of keys by storing one or more second offsets of the set of offsets in the leaf block in a new data structure including a set of records, the one or more second offsets being contiguous in the new data structure, and each record of the set of records of the new data structure including a key after the start key of the first subset of the set of keys and the associated offset of the key.

8. The computer-implemented method of claim 7, wherein determining the set of offsets further comprises comparing the start key with each other key of the first subset of keys, wherein each offset of the set of offsets corresponds to a difference between the start key and a subsequent key of the first subset of keys.

9. The computer-implemented method of claim 8, wherein each particular offset of the one or more offsets are stored:
as a partial keys corresponding to the difference between the start key and a subsequent key of the first subset of keys in the leaf block subsequent to the start key, according to the ordinal key index.

10. The computer-implemented method of claim 7, wherein the operation of compressing the first subset of the set of keys further comprises:
determining that each offset of the set of offsets has a same size; and
in response to determining that each offset of the set of offsets has a same size, storing one offset of the one or more offsets in a header of the leaf block, the one offset of the one or more offsets indicating the offset for each key of the first subset of keys is the same size and is based on the ordinal key index.

11. The computer-implemented method of claim 10, wherein the ordinal key index and the one offset of the one or more offsets implicitly represent each key of the third subset of keys.

12. The computer-implemented method of claim 7, wherein the hierarchical data structure is a B+Tree, wherein each key of the subset of the set of keys represents a file offset of a file, and wherein the B+Tree is used to store a file layout tree representing the file.

13. A non-transitory machine-readable storage medium, including instructions configured to cause a processing apparatus to perform operations including:
accessing a set of keys, each key of the set of keys being associated with a pointer to one or more data blocks of a block-oriented storage device, the set of keys being arranged according to an ordinal key index, and the set of keys including a start key being first from amongst the set of keys;
defining a hierarchical data structure configured to store the set of keys, the hierarchical data structure including a leaf block, the leaf block being configured to store a first subset of keys of the set of keys according to the ordinal key index;
storing first one or more keys of the first subset of keys in the leaf block, the first one or more keys including at least the start key;
determining a set of offsets, each offset the set of offsets corresponding to a key of the first subset of keys;
determining whether the first subset of keys is contiguous;
in response to determining that the first subset of keys is contiguous, compressing the first subset of keys by storing one or more first offsets of the set of offsets in the leaf block, the one or more first offsets corresponding to second one or more keys of the first subset of keys; and
in response to determining that the subset of the set of keys are not contiguous, compressing the first subset of keys by storing one or more second of the set of offsets in the leaf block in a new data structure including a set of records, the one or more second offsets being contiguous in the new data structure, and each record of the set of records of the new data structure including a key after the start key of the first subset of the set of keys and the associated offset of the key.

14. The non-transitory machine-readable storage medium of claim 13, wherein determining the set of offsets further comprises comparing the start key with each other key of the first subset of keys, wherein each offset of the set of offsets corresponds to a difference between the start key and a subsequent key of the first subset of keys.

15. The non-transitory machine-readable storage medium of claim 14, wherein each particular offset of the one or more offsets are stored:
as a partial keys corresponding to the difference between the start key and a subsequent key of the first subset of keys in the leaf block subsequent to the start key, according to the ordinal key index.

16. The non-transitory machine-readable storage medium of claim 13, wherein the operation of compressing the first subset of the set of keys further comprises:
determining that each offset of the set of offsets has a same size; and
in response to determining that each offset of the set of offsets has a same size, storing one offset of the one or more offsets in a header of the leaf block, the one offset of the one or more offsets indicating the offset for each key of the first subset of keys is the same size and is based on the ordinal key index.

17. The non-transitory machine-readable storage medium of claim 16, wherein the ordinal key index and the one offset of the one or more offsets implicitly represent each key of the third subset of keys.

* * * * *

UNITED STATES PATENT AND TRADEMARK OFFICE
CERTIFICATE OF CORRECTION

| | |
|---|---|
| PATENT NO. | : 11,366,796 B2 |
| APPLICATION NO. | : 16/863025 |
| DATED | : June 21, 2022 |
| INVENTOR(S) | : Sridhar Valaguru |

It is certified that error appears in the above-identified patent and that said Letters Patent is hereby corrected as shown below:

In the Specification

In Column 10, Line 24, delete "offse_t start":" and insert -- offset_start": --, therefor.

In Column 12, Line 31, delete "offset_size" and insert -- offset size --, therefor.

In Column 14, Line 14, delete "30th" and insert -- $30^{th}$ --, therefor.

In Column 14, Line 19, delete "100th" and insert -- $100^{th}$ --, therefor.

In the Claims

In Column 28, Line 28, in Claim 13, delete "each offset the set of offsets" and insert -- each offset of the set of offsets --, therefor.

Signed and Sealed this
Thirteenth Day of December, 2022

Katherine Kelly Vidal
*Director of the United States Patent and Trademark Office*